Aug. 21, 1973   F. H. HAMMOND, JR   3,753,885
COUNTERCURRENT ELECTRODEPOSITION PROCESS
Filed Dec. 27, 1971

3,753,885
COUNTERCURRENT ELECTRODEPOSITION
PROCESS
Fred H. Hammond, Jr., Wellesley, Mass., assignor to
The Kendall Company, Walpole, Mass.
Filed Dec. 27, 1971, Ser. No. 212,418
Int. Cl. B01k 5/02; C23b 13/00
U.S. Cl. 204—181                                          10 Claims

ABSTRACT OF THE DISCLOSURE

A continuous electrodeposition method for producing a coherent, organic polymeric film from an aqueous dispersion of electrodepositable organic polymeric particles having a reference electrode at least partially immersed therein is disclosed. The method comprises continuously moving a depositing conductive surface so that a portion thereof is immersed at any one time in said aqueous dispersion of organic polymeric particles, while causing said aqueous dispersion to flow counter to the direction of movement of said depositing conductive surface, and subjecting the aqueous dispersion between said depositing conductive surface and said reference electrode to a D.C. electric field, thereby causing said organic polymeric particles to migrate towards said depositing conductive surface and form a coherent, organic polymeric film thereon.

---

This invention relates to a continuous method for the electrodeposition of a coherent, organic polymeric film. More particularly, this invention relates to the production of the aforementioned films by a countercurrent electrodeposition process.

Polymeric films have previously been formed by various electrodeposition processes. For example, U.S. Pats. 1,583,704 and 1,719,984 disclose the deposition of rubber from a latex emulsion by batch and concurrent deposition methods.

The batch method, while suitable for the production of certain items, inherently results in a change in the solids concentration of the bath, thus presenting operational and product uniformity difficulties. In order to compensate for this change in concentration, one must resort to procedures such as dialysis or ultrafiltration, or employ a replenished bath system such as is commonly used in the electrocoating industry. In the latter system, one cannot employ dispersions but is limited to the addition of solids to the bath. Furthermore, the replenished bath system necessitates adjustment of pH and small ion content in order to maintain the identity of the bath.

Continuous concurrent electrodeposition is another well-known technique, but this method also has certain drawbacks. Thus, deposition occurs first from a concentrated dispersion, resulting in selective deposition of the smaller and higher charged particles, thereby initially producing a layer of film having low water content. This layer has a relatively high resistance and tends to decrease the rate of further deposition, thus limiting the total thickness of the film. Furthermore, the continuous concurrent process is inefficient, since all the material in the bath cannot be recovered in a single pass.

Countercurrent electrodeposition has previously been employed in the non-analogous field of purification of liquids by depositions therefrom of solid particulate matter; typical of this body of art are U.S. Pat. 2,448,848 and 2,516,535.

Now it has been found that a coherent, organic polymeric film can be electrodeposited from an aqueous dispersion of electrodepositable organic polymeric particles by a method which obviates the problems encountered with the prior art processes. More particularly, the method of this invention comprises continuously moving a depositing conductive surface so that a portion thereof is immersed at any one time in an aqueous dispersion of electrodepositable organic polymeric particles, said dispersion having a reference electrode at least partially immersed therein, while causing said aqueous dispersion to flow counter to the direction of movement of said depositing conductive surface, and subjecting the aqueous dispersion between said depositing conductive surface and said reference electrode to a D.C. electric field, thereby causing said organic polymeric particles to migrate towards said depositing conductive surface and form a coherent, organic polymeric film thereon.

The aforementioned method is advantageous in that it provides for steady operating conditions, the use of dispersions of high molecular weight particles, the buildup of thick films, and depletion of the bath in a single pass.

The method of this invention will be better understood by reference to the following description and the accompanying drawings in which.

Figure 1:
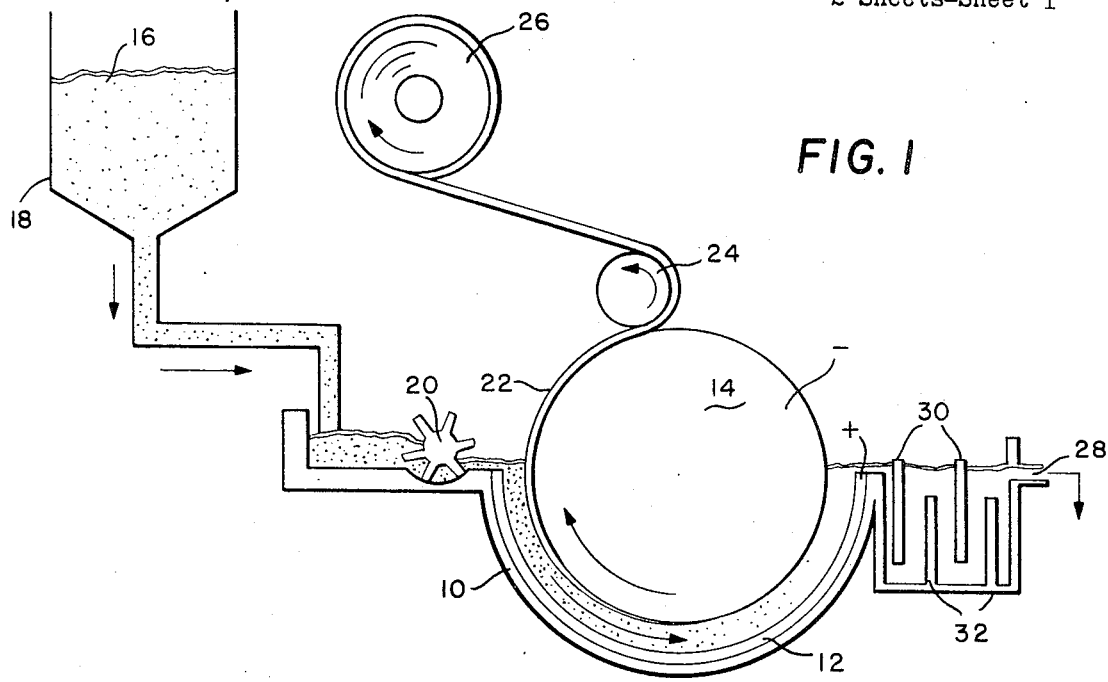
FIG. 1 is a schematic representation of an apparatus suitable for carrying out the method of this invention.

Referring to FIG. 1, there is shown a suitable container 10, having reference electrode 12 disposed therein, which is the anode in this embodiment. Preferably the anode is graphite or platinum, but any suitable inert, non-eroding material can be used. Depositing conductive surface 14 is in the form of a hollow or solid metal roll or cylinder which rotates during the electrodeposition process; in FIG. 1 it is the cathode and is conveniently made of stainless steel or a chrome-plated metal. Reference electrode 12 and depositing conductive surface 14 are connected by conventional means to a direct current source (not shown).

A cationic aqueous dispersion of polymeric particles 16 is metered from supply tank 18 by metering device 20 and caused to flow counter to the direction of rotation of depositing conductive surface 14. The electric field established between reference electrode 12 and depositing conductive surface 14 causes migration of the polymeric particles in aqueous dispersion 16 towards depositing conductive surface 14, where the particles become ionically destabilized and form a coherent, organic polymeric film 22 thereon. This film 22 is removed from the depositing conductive surface 14 in the form of a continuous sheet; after passing around guide roll 24, it is taken up by wind-up roll 26. Effluent 28, essentially free from polymeric particles, is continuously passed through a series of baffles 30 and weirs 32 and drawn off and discarded at the opposite end of reference electrode 12.

Where complete recovery of materials in a single pass is desired, it is essential that a concentration gradient be maintained along the path of deposition. In order to achieve this condition, mixing of the dispersion must be avoided to permit putting concentrated dispersion in at one end of the housing and taking polymer-free effluent out at the other end. Factors which cause mixing, thereby influencing this concentration gradient, include the spacing between the reference electrode and depositing conductive surface, the rate of flow of the dispersion, the size of the apparatus and the speed of movement of the depositing conductive surface. Preferably, the reference electrode and depositing conductive surface are constructed to provide for a small spacing therebetween and are equidistant from each other along the path of deposition; such a construction is illustrated by the drawings. However, it is feasible to maintain a concentration gradient with configurations wherein the spacing between the reference electrode and depositing conductive surface varies along the path of deposition. It will be appreciated that if the rate of flow of the dispersion is too high, turbulent flow and mixing result, while minimal flow undesirably results in a dispersion concentration similar to that in a batch process where no concentration gradient is present. Furthermore, the quantity of polymer fed in as dispersion should equal the quantity of polymer taken out as film. It is preferred to feed in dispersion at a constant rate, thereby causing it to flow at a constant rate, and to move the depositing conductive surface at a constant speed.

In practicing the method of this invention, one preferably operates at that current which will remove substantially all of the dispersed polymeric particles as film. Generally an applied voltage of 50 to 250 volts is employed to produce this current. Within this range, where self-limiting films, i.e., films having an inherent maximum thickness, are being deposited, one preferably operates at the limiting voltage. This limiting voltage is the applied voltage necessary to produce a film of the desired thickness. If more than the limiting voltage is applied, some regions have a build-up of deposited polymer, resulting in a nonuniform film. Operating below the self-limiting voltage, it is impossible to build up the film to the desired thickness and to exhaust completely. Preferably the process of this invention is carried out at a constant current; power supplies with this characteristic are known in the art. It is also preferred in the practice of this invention to maintain a constant dispersion temperature in order to insure uniform operating conditions. This can be achieved either by cooling the dispersion or the depositing conductive surface by a suitable means. Preferably a constant temperature below about 80° C. and more preferably between about 30° and 60° C. is maintained.

Any aqueous dispersion of electrodepositable organic polymeric particles, that is dispersions having the following properties, can be employed in the process of this invention. First, the film-forming temperature of the dispersed polymer must be below 80° C., or the polymer must be plasticized to reduce the film-forming temperature to this temperature; and secondly, the dispersion must contain charged particles and where a mixture of charges is present, one charge must dominate.

Typical dispersions which are not intended to be limiting are those in which the polymer comprises a monomer such as:

(1) Acrylic and methacrylic esters with from 1 to 28 carbon atoms, the average being 1 to 14 carbon atoms, in the alkyl ester group, such as methyl acrylate, ethyl acrylate, butyl acrylate, octyl acrylate, decyl methacrylate.
(2) Vinyl esters, wherein the acid radical contains at least 2 carbon atoms, such as vinyl acetate, vinyl propionate.
(3) Vinyl ethers wherein the alkyl group has more than 1 carbon atom, such as butyl vinyl ether, octyl vinyl ether.
(4) Polar and reactive monomers such as acrylic and methacrylic acids; acrylamides, methacrylamides, and the N-substituted derivatives, such an N-methyl acrylamide, N-t-butyl acrylamide; monomers derived from $\alpha,\beta$-unsaturated dicarboxylic acids, acid esters, and amic acids, such as maleic acid, butyl acid maleate, hexyl acid maleate, N-dodecyl maleamic acid, itaconamic acid, such as disclosed in U.S. Pat. 3,299,010; and vinyl monomers containing reactive groups, such as N-methylol methacrylamide, N-methoxymethyl acrylate, hydroxyethyl methacrylate.
(5) Monomers containing —CN groups, such as acrylonitrile, cyanoethyl acrylate.
(6) Alkoxy-containing monomers, such as methoxyethyl acrylate, ethoxyethyl methacrylate, ethoxyethyl vinyl ether.
(7) Allyl and methallyl monomers, such as allyl chloride, allyl acetate, methallyl alcohol.
(8) Monomers containing two or more vinyl groups, such as allyl acrylate, ethylene glycol dimethacrylate, glyceryl trimethacrylate.
(9) Vinyl halides such as vinyl chloride, vinyl bromide, vinylidene chloride, vinylidene fluoride.
(10) Tetrafluoroethylene.
(11) Urethane forming monomers.
(12) Epoxy-containing monomers, such as glycidyl methacrylate, glycidyl acrylate.

Copolymers comprising two or more of the above monomers can also be suitably employed in the process of this invention.

Where dispersions of polymers are not inherently capable of electrodeposition, that is, where the polymer per se is not ionically charged, they can be made so by conventional means such as preparation in the presence of anionic or cationic surfactants. Small amounts of non-ionic surfactants can also be used in connection with an anionic or cationic surfactant, and such systems often give better wetting at the depositing conductive surface.

Dispersions of polymers inherently capable of electrodeposition can be stabilized by the charge in the polymer, or by an anionic or cationic surfactant, or by a combination thereof; non-ionic surfactants can also be employed in combination with the aforementioned systems.

It will be apparent that the use of large amounts of surfactant should be avoided where a coalesced film is desired.

Preferred in the process of this invention are dispersions which are inherently capable of electrodeposition, such as those disclosed in U.S. Pats. 2,939,855 and 3,492,260.

The concentration of the aqueous dispersion can range from about 4 to about 40 percent by weight. The thickness of the deposited film, which is directly proportional to the concentration of the dispersion and the rate at which the dispersion is metered in, and inversely proportional to the rate at which the depositing conductive surface is moved, can vary but is generally greater than about 0.01 mils; preferably films having a thickness of from about 0.5 to about 2.0 mils are produced.

The maximum film thickness directly depends on the conductivity of the deposited film, which in turn depends on the nature of polymer and surfactant in the dispersion; the more conductive films tend to be thicker.

While the process of this invention has broad applicability to the type of film electrodeposited, it is particularly preferred to deposit acrylate polymers and copolymers from dispersions having a concentration of about 15 to about 30 percent by weight, and employing an applied voltage of about 75 to 125 volts.

Figure 2:
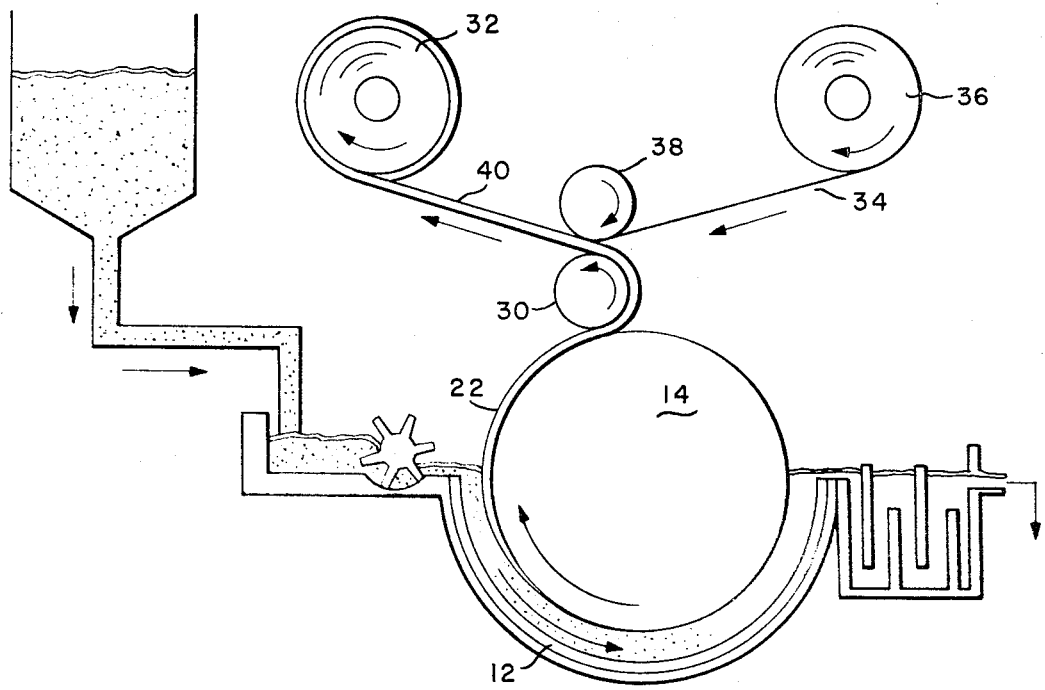
FIG. 2 is a modification of the apparatus of FIG. 1 containing means for combining the organic polymeric film with another material.

FIG. 2 is similar to FIG. 1, except that provision is made for combining film 22 with sheet material 34 which is taken from supply roll 36. After passing between guide rolls 30 and 38, the composite 40 is taken up by roll 32.

Sheet material 34 can be any suitable material such as fibrous webs, paper, a woven or non-woven fabric, a plastic film, a metal foil, etc.

Figure 3:
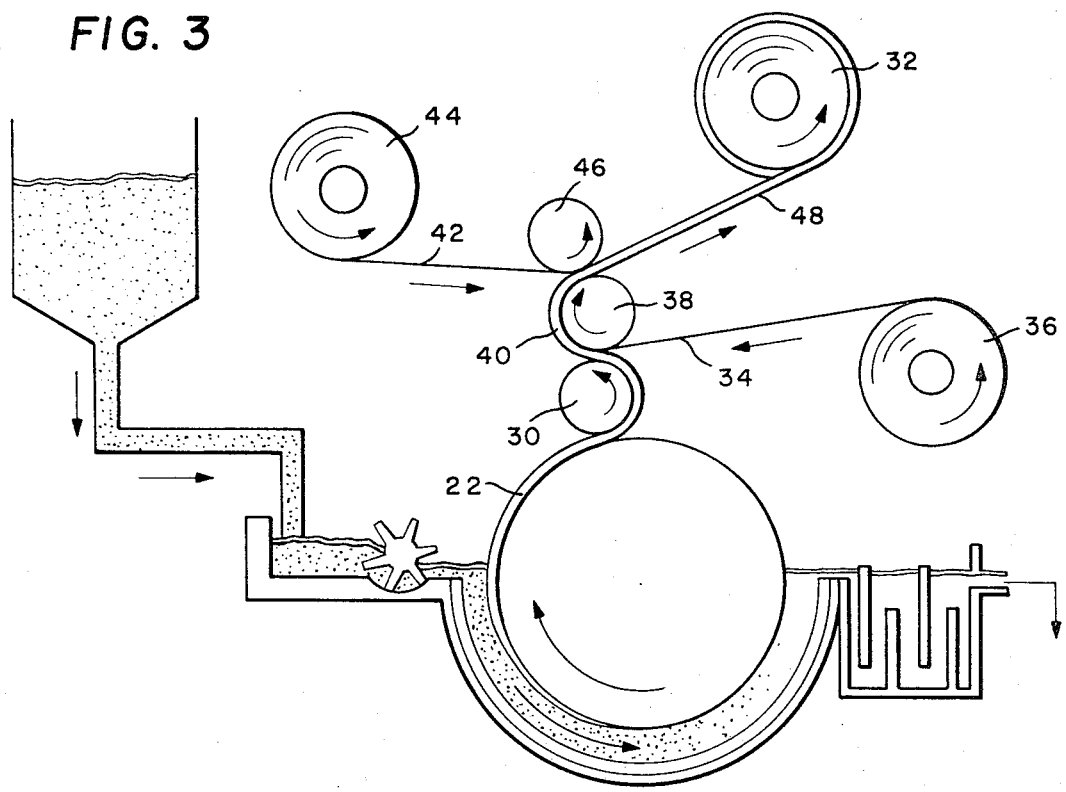
FIG. 3 is another modification of the apparatus of FIG. 1 wherein the organic polymeric film is used in a lamination procedure.

FIG. 3 depicts a process similar to FIG. 2 but wherein a second sheet material 42 is fed from supply roll 44 and applied to composite 40; after passing between guide rolls 38 and 46, laminate 48 is taken up by roll 32. A preferred example of such an operation is the use of an acrylate film to laminate two non-wovens.

Figure 4:
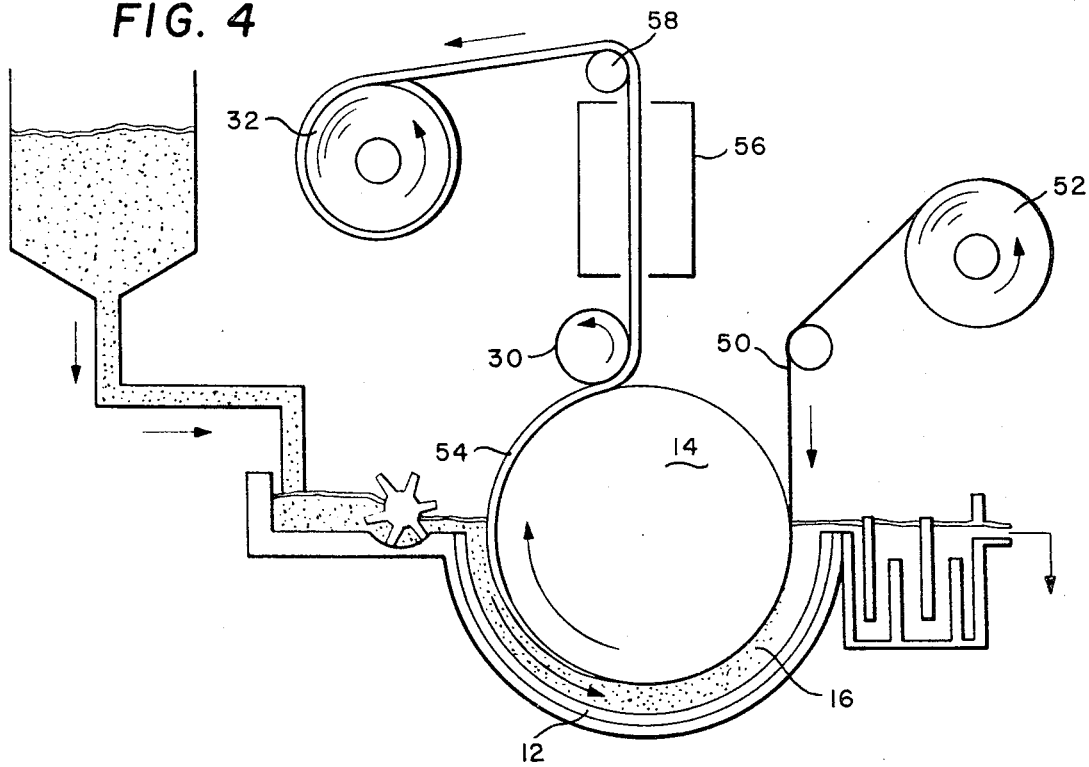
FIG. 4 shows an apparatus wherein the depositing conductive surface is used as a substrate for the organic polymeric film.

In the process shown in FIG. 4, a substrate 50 is fed from supply roll 52 into dispersion 16. Deposition takes place directly on substrate 50 and coated substrate 54 is removed from depositing conductive surface 14, passed through an oven 56, over guide roll 58 and taken up by roll 32.

Substrate 50 can be any permeable woven, non-woven, or plastic material which is interposed between reference electrode 12 and depositing conductive surface 14. Thus, vinyl fabrics, woven adhesive tape backings, etc., can be coated or impregnated with film in this manner. Substrate 50 can also be a metal foil, wire, etc., which is conencted to a source of current; in such an embodiment, substrate 50 serves directly as the depositing conductive surface. Thus, the term "depositing conductive surface" in the claims and specification herein is intended to include an electrode from which film is continuously removed, either as a self-supporting film or as a coating on a permeable substrate, or an electrode which is used as a substrate for the film, the coated substrate being continuously removed from the bath.

Other process variations will also be apparent from the foregoing description of the invention. For example, a barrier layer such as that described in co-pending application Ser. No. 32,106, filed Apr. 27, 1970, may also be employed. Also, various apparatus can be employed, e.g., the apparatus of FIG 4 could be altered to pass substrate 50 through a hollow cylinder where the substrate is the depositing electrode.

Furthermore, although the invention has been illustrated with respect to cationic deposition, the polarity of the reference electrode and depositing conductive surface can be reversed and anionic dispersions employed, using an inert, non-eroding material for the anode.

As previously mentioned and illustrated by the drawings, the process of this invention may be used for the production of films having a variety of useful applications. Thus, binders for non-wovens, pressure-sensitive adhesives, fabric/film laminates, metal adhesive tapes, tire cords, etc., can all be conveniently produced. Furthermore, the electrodeposited film can be continuous, homogeneous, or porous sheet, or an apertured or discontinuous structure.

The following examples, which are not intended to be limiting, will serve to illustrate the process of this invention. All parts are by weight unless otherwise specified.

EXAMPLE 1

A coherent, organic polymeric film was electro-deposited from a cationic aqueous dispersion employing an apparatus as shown in FIG. 1. The dispersion was prepared from a copolymer of 80 parts of ethyl acrylate, 10 parts of butyl acrylate and 10 parts of acrylonitrile; the copolymer was prepared by redox emulsion polymerization employing 2.0 parts of a 25% by weight aqueous dispersion of Triton X–400 as a dispersant and 300 parts of water. Triton X–400 is stearyldimethylbenzylammonium chloride as marketed by the Rohm and Haas Company. The dispersion was adjusted to contain 20% by weight solids. The depositing conductive surface was a hollow polished stainless steel cylinder (cathode), 8 inches in diameter and 6 inches wide. The reference electrode was a graphite static anode spaced 3/16 of an inch from the depositing conductive surface and forming a channel or deposition path 10 inches long. The dispersion at room temperature was metered into this channel at a rate of 54 cc. per minute, while rotating the cathode countercurrent to the flow of the dispersion at a surface speed of 9 feet per minute. Passage of 6 amp. direct current by applying a potential of 100 volts produced a coherent, well coalesced film 1 mil in thickness on the cathode. The film was continuously removed from the cathode and rolled up; depleted dispersion effluent containing less than 0.1% by weight solids flowed out the exit end of the interelectrode channel.

EXAMPLE 2

The procedure, apparatus, dispersion and operating conditions described in Example 1 were followed except that the dispersion was adjusted to 24% by weight solids and metered in at a rate of 34 cc./min., and the cathode was rotated at a surface speed of 10 feet per minute. The film of deposited polymer was 0.57 mil thick and contained 25% by weight water; the depleted dispersion effluent contained less than 1% by weight solids.

EXAMPLE 3

The procedure, apparatus, dispersion and operating conditions described in Example 2 were followed except that the dispersion was metered at a rate of 36 cc./min. The resulting film was 0.68 mil thick and contained 22% by weight water; the depleted dispersion effluent contained less than 1% by weight solids.

EXAMPLE 4

Following the procedure and employing the apparatus and general operating conditions described in Example 3, the dispersion of Example 1 was adjusted to 16% by weight solids and metered in at 54 cc./min. to produce a film 0.6 mil thick containing 25% by weight water. The depleted dispersion effluent contained less than 1% by weight solids.

EXAMPLE 5

Example 4 was repeated except that the dispersion was adjusted to 20% by weight solids and metered in at 34 cc./min. and a potential of 150 volts was applied. A 0.75 mil thick film containing 17% by weight water was obtained; the depleted dispersion effluent contained 0.2% by weight solids.

EXAMPLE 6

An aqueous dispersion of polymer was prepared following the procedure and employing the monomers described in Example 1 but using 0.5 part of Kemamine BQ9742C as the dispersant. This dispersant, which is marketed by Humko Products, Chemical Division, Memphis, Tenn., is a dimethyl tallow benzyl ammonium chloride having a minimum of 75% by weight active material and an average molecular weight of 420. Employing the apparatus and operating conditions described in Example 1, the dispersion containing 25% by weight solids was metered in at a rate of 60 cc./min. at room temperature. The cathode was rotated at a surface speed of 10 feet per minute. Passage of 5 amp. direct current by applying a potential of 100 volts produced a 1 mil thick film having a water content of 25% by weight; the depleted dispersion effluent contained 0.8% by weight solids. The film was continuously removed from the cathode.

EXAMPLE 7

The dispersion, apparatus and operating conditions described in Example 6 were employed with the exception that the dispersion was maintained at 50° C. and metered in at 120 cc./min. and 5 amp. were passed by applying a potential of 75 volts. A film having a thickness of 2.0 mils and a water content of 15% by weight was continuously removed from the cathode. The depleted dispersion effluent contained 1.1% by weight solids.

EXAMPLE 8

An aqueous dispersion of polymer was prepared following the procedure and employing the monomers described in Example 1 but using 0.5 part of the reaction product of epichlorohydrin with Armeen DM18D as the dispersant. Armeen DM18D, which is marketed by Armour Industrial Chemicals is a dimethyl tertiary amine containing a minimum of 75% tertiary amine and having a molecular weight of 297 and a specific gravity of 0.781. Employing the apparatus and general operating conditions described in Example 1, dispersion at 25% solids was metered in at 60 cc./min. at room temperature. The cathode was rotated at a surface speed of 10 feet per minute. Passage of 7.5 amp. direct current by applying a potential of 75 volts produced a 1.3 mil thick film having a water content of 30% by weight. The depleted dispersion effluent contained less than 1% by weight solids.

EXAMPLES 9–11

Following the procedure and employing the monomers described in Example 1 but using 1 part of the quaternary ammonium reaction product of Kemamine T9902D and epichlorohydrin as dispersant, an aqueous dispersion of polymer was prepared. Kemamine T9902D is distilled dimethyl stearyl amine as marketed by Humko Products, Chemical Division. Employing the apparatus and general operating conditions described in Example 1, dispersion at 25% solids was metered in at room temperature at a rate of 16, 32 and 72 cc./min. The cathode was rotated at surface speeds of 3, 5 and 12 feet per minute respectively, while 2.5, 4.0 and 9.5 amp. of direct current were passed by applying potentials of 100, 110 and 100 volts respectively in Examples 9–11. All films were 1 mil thick and the depleted dispersion effluent contained less than 0.2% by weight solids.

EXAMPLES 12–14

Examples 9–11 were repeated with the following variations; the cathode was rotated at 1.2, 3 and 5 feet per minute respectively, and .75, 2.5 and 5.0 amp. of direct current were passed by the application of 35, 75 and 90 volts. All the films were 1 mil thick and the depleted dispersion effluent contained less than 0.7% solids.

EXAMPLE 15

A coherent organic polymeric film was electrodeposited from a cationic dispersion on an apparatus arranged as in FIG. 1. The dispersion was prepared from a copolymer of ethyl acrylate 70 parts, butyl acrylate 10 parts, acryonitrile 10 parts, vinylidene chloride 10 parts, and glycidal acrylate 1 part. The copolymer was prepared by redox emulsion polymerization using one part of the quaternary ammonium reaction product described in Examples 9–11 as dispersant and 300 parts demineralized, oxygen-free water. The dispersion was adjusted to contain 25% by weight solids. The cathode was cooled by passing water at 30° C. continuously through the hollow cylinder. The dispersion was metered into the interelectrode channel at a constant rate of 28 cc./min. while rotating the cathode at a constant surface speed of 5.2 feet per minute. Passage of a constant 7.5 amperes direct current at approximately 80 volts established a steady operating condition which deposited coherent, well coalesced film, 1 mil thick, containing 19% by weight of water. The film was removed from the cathode and rolled up. Depleted dispersion effluent containing less than 0.05% by weight solids flowed out the exit end of the interelectrode channel.

EXAMPLE 16

Example 10 was repeated using the apparatus shown in FIG. 2. An FEP resin-covered metal roll was used as guide roll 38 and the film was transferred to 40 lb./ream kraft paper.

EXAMPLE 17

Example 16 was repeated with the exception that the FEP resin-covered metal roll was heated at 300° F. and pressed against guide roll 30 with a pressure of 10.0 lbs. per linear inch. The polymeric film was combined with 25 g. per sq. yd. carded 3 denier rayon to form a nonwoven fabric with a machine-direction tensile of 15 lbs. per inch and a cross-direction tensile of 2 lbs. per inch.

What is claimed is:

1. A continuous electrodeposition method for producing a coherent, organic polymeric film from an aqueous dispersion of electrodepositable organic polymeric particles having a reference electrode at least partially immersed therein, which comprises continuously moving a depositing conductive surface so that a portion thereof is immersed at any one time in said aqueous dispersion of organic polymeric particles, while causing said aqueous dispersion to flow counter to the direction of movement of said depositing conductive surface, and subjecting the aqueous dispersion between said depositing conductive surface and said reference electrode to a D.C. electric field, thereby causing said organic polymeric particles to migrate towards said depositing conductive surface and form a coherent, organic polymeric film thereon.

2. The method of claim 1 wherein said depositing conductive surface moves at a constant speed, and wherein effluent essentially free from said organic polymeric particles is continuously removed.

3. The method of claim 1 wherein said depositing conductive surface is the cathode.

4. The method of claim 1 wherein said coherent, organic polymeric film is continuously removed from said depositing conductive surface.

5. The method of claim 4 wherein said coherent, organic polymeric film is a pressure-sensitive adhesive.

6. The method of claim 4 wherein said coherent, organic polymeric film is a binder.

7. The method of claim 6 further comprising the step of combining said binder with a substrate.

8. The method of claim 1 wherein said depositing conductive surface is a substrate for said organic polymeric film, and said surface bearing said film is continuously removed from said aqueous dispersion.

9. The method of claim 1 wherein said aqueous dispersion is maintained at a constant temperature below about 80° C.

10. The method of claim 1 wherein said aqueous dispersion is maintained at a constant temperature below about 80° C., and caused to flow at a constant rate, said depositing conductive surface is moved at a constant speed, and said D.C. electric field is supplied by a constant current source.

References Cited

UNITED STATES PATENTS

| 1,589,329 | 6/1926 | Sheppard et al. | 204—183 |
| 3,424,663 | 1/1969 | Weigel | 204—181 |

HOWARD S. WILLIAMS, Primary Examiner

U.S. Cl. X.R.

204—300, 183